US008545982B2

United States Patent
Ishii et al.

(10) Patent No.: US 8,545,982 B2
(45) Date of Patent: *Oct. 1, 2013

(54) HEXAGONAL TYPE BARIUM TITANATE POWDER, PRODUCING METHOD THEREOF, DIELECTRIC CERAMIC COMPOSITION AND ELECTRONIC COMPONENT

(75) Inventors: Tatsuya Ishii, Tokyo (JP); Takeo Tsukada, Tokyo (JP); Hidesada Natsui, Tokyo (JP); Kenichiro Masuda, Tokyo (JP); Shigekazu Hidaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,140

(22) Filed: Sep. 6, 2011

(65) Prior Publication Data
US 2012/0077036 A1    Mar. 29, 2012

(30) Foreign Application Priority Data
Sep. 27, 2010  (JP) ................. 2010-215754

(51) Int. Cl.
*B32B 9/00* (2006.01)
*H01G 4/06* (2006.01)
*C04B 35/00* (2006.01)
*C01G 23/00* (2006.01)

(52) U.S. Cl.
USPC .......... 428/402; 361/321.1; 423/598; 501/32; 501/137

(58) Field of Classification Search
None
See application file for complete search history.

(56) References Cited

U.S. PATENT DOCUMENTS

| 6,352,681 | B1* | 3/2002 | Horikawa et al. ............. 423/598 |
| 2002/0141139 | A1* | 10/2002 | Nakamura et al. ......... 361/321.2 |
| 2010/0067171 | A1* | 3/2010 | Yamazaki et al. ......... 361/321.4 |
| 2011/0110017 | A1* | 5/2011 | Natsui et al. ............... 361/321.1 |
| 2011/0110018 | A1* | 5/2011 | Ishii et al. .................. 361/321.5 |

FOREIGN PATENT DOCUMENTS

| JP | A-2002-234769 | 8/2002 |
| JP | A-2006-327846 | 12/2006 |
| JP | B2-4325900 | 9/2009 |

OTHER PUBLICATIONS

Burn, I. "Mn-doped polycrystalline BaTiO3" Journal of Materials Science 14(1979): 2453-2458.*
Wang et al., "Properties of Hexagonal Ba($Ti_{1-x}Mn_x$)$O_3$ Ceramics: Effects of Sintering Temperature and Mn Content," *Japanese Journal of Applied Physics*, 2007, vol. 46, No. 5A, pp. 2978-2983.
"Microwave dielectric properties of gallium-doped hexagonal barium titanate ceramics": Journal of American Ceramic Society, 86[3], 511-13 (2003).

* cited by examiner

*Primary Examiner* — Jennifer Chriss
*Assistant Examiner* — Thomas Mangohig
(74) *Attorney, Agent, or Firm* — Oliff & Berridge, PLC

(57) ABSTRACT

To provide a hexagonal type barium titanate powder having a fine and uniform particle size and contributing to a thinner dielectric layer. A hexagonal type barium titanate powder according to the present invention has the following characteristics that a maximum particle diameter is 1.0 μm or less, a ratio of 90% accumulated particle diameter and 50% accumulated particle diameter is 3.0 or less, and a hexagonal ratio is 50% or more.

7 Claims, 1 Drawing Sheet

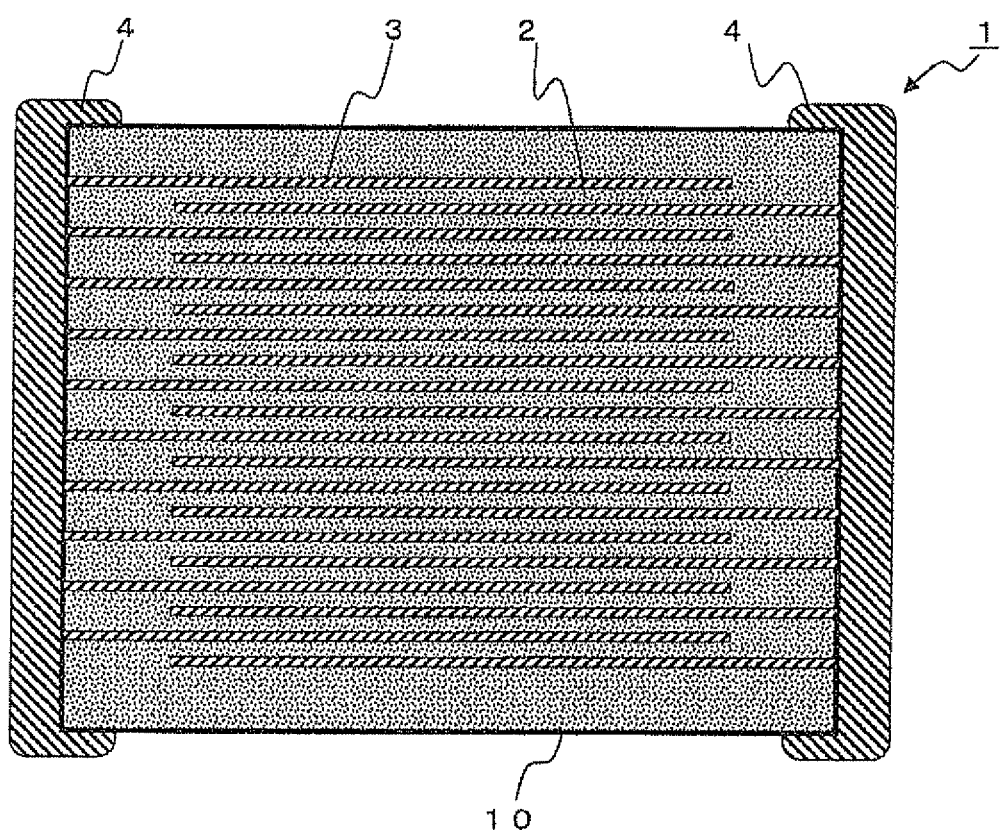

HEXAGONAL TYPE BARIUM TITANATE POWDER, PRODUCING METHOD THEREOF, DIELECTRIC CERAMIC COMPOSITION AND ELECTRONIC COMPONENT

TECHNICAL FIELD

The present invention relates to a hexagonal type barium titanate powder, more precisely, relates to a hexagonal type barium titanate powder having a fine and uniform particle size and contributing to thin a dielectric layer. Specifically, the hexagonal type barium titanate powder of the present invention is preferably used to produce a dielectric layer of electronic component used for temperature compensation, for example. Moreover, the present invention relates to a producing method and a usage of the hexagonal type barium titanate powder.

DESCRIPTION OF THE RELATED ART

Among ceramic capacitors as an example of electronic components, some is used for temperature compensation purpose. For capacitors used for such purpose, it is required that change of characteristics such as specific permittivity and the like in a wide temperature range is small.

As for dielectric material of such capacitors, for example, a material based on paraelectrics such as $(Ca)(Ti, Zr)O_3$ is used (refer to Patent Literature 1). However, because based on the paraelectrics, a comparatively high specific permittivity cannot be obtained. For example, when using dielectric material disclosed in Patent Literature 1, specific permittivities resulted in 50 or less. Therefore, there is a limitation of increasing a capacitor capacity.

In the meantime, as for a new material having comparatively high specific permittivity, for example, hexagonal barium titanate can be exemplified. Although the hexagonal barium titanate has lower specific permittivity than the barium titanate having perovskite type crystal structure (tetragonal, cubic), it shows higher permittivity than the paraelectrics.

However, in a crystal structure of the barium titanate, hexagonal structure is a metastable phase, normally, it can be exist only at 1460° C. or higher. Therefore, in order to obtain the hexagonal barium titanate at room temperature, it is necessary to cool rapidly from the high temperature of 1460° C. or higher.

In this case, a specific surface area of the obtained hexagonal barium titanate becomes $1\ m^2/g$ or less because of the rapid cooling from the high temperature, thus a coarse powder is only obtained. When producing electronic components with thinner dielectric layer by using such coarse powder, there is a problem that it cannot maintain the sufficient reliability, because the powder fails to adapt to the thinner dielectric layer.

By the way, as for a producing method of the hexagonal barium titanate, for example, Non-Patent Literature 1 discloses that $BaCO_3$, $TiO_2$, and $Mn_3O_4$ are used as starting raw materials and are heat-treated. By this means, a transformation temperature to hexagonal phase can be lowered, hexagonal barium titanate in which Mn is solid-soluted is obtained by a heat treatment at a temperature lower than 1460° C.

However, the specific surface area of the hexagonal barium titanate obtained in the Non-Patent Literature 1 is approximately $1.6\ m^2/g$. Although an average particle diameter estimated from this specific surface area is approximately 0.6 µm, actually, coarse particles with diameter over 1 µm are included. It is insufficient for applying a thinner dielectric layer in the electronic components even though using this hexagonal barium titanate powder.

Moreover, the Patent Literature 2 discloses a production example of the fine and uniform barium titanate powder which has few crystal defects by a heat treatment at a temperature lower than 900° C. However, a hexagonal ratio of the barium titanate powder obtained in the Patent Literature 2 is approximately 5% at most, and the fine and uniform barium titanate powder which has a high hexagonal ratio is not obtained yet.

PRIOR ART LITERATURE

Patent Literature

Patent Literature 1: Japanese Patent No. 4325900.
Patent Literature 2: Japanese Patent Publication No. 2006-327846.

Non-Patent Literature

Non-Patent Literature 1 "Properties of Hexagonal $Ba(Ti_{1-x}Mn_x)O_3$ Ceramics: Effects of Sintering Temperature and Mn Content", Japanese Journal of Applied Physics, 2007 Vol. 46 No. 5A 2978-2983.

BRIEF SUMMARY OF THE INVENTION

Problems to be Solved by the Invention

The present invention has been made by considering such situations, and a purpose of the invention is to provide a hexagonal type barium titanate powder having a fine and uniform particle size and contributing to thin a dielectric layer.

Means of Solving the Problems

In order to achieve the above mentioned purposes, according to keen examination by the present inventors, as for the barium titanate wherein a part of Ti site of the barium titanate ($BaTiO_3$) was substituted with a certain amount of a specific trivalent metal ion, they found that the hexagonal phase is stable at comparatively low temperature and the hexagonal type barium titanate having a fine and uniform particle size can be obtained by using specifically fine raw material powder. From these, they could achieve the present invention.

More specifically, the following is the gist of the present invention solving the above problems.

(1) A hexagonal type barium titanate powder, wherein
a maximum particle diameter is 1.0 µm or less,
a ratio (D90/D50) of 90% accumulated particle diameter (D90) and 50% accumulated particle diameter (D50) is 3.0 or less, and
a hexagonal ratio is 50% or more.
(2) The hexagonal type barium titanate powder as set forth in (1) shown by $Ba_A(Ti_{1-\alpha}M_\alpha)_BO_3$, wherein
M is a trivalent metal ion having an effective ionic radius in the range from 0.58 to 0.64 Å,
A/B is in the range from 0.900 to 1.040, and
α is in the range from 0.03 to 0.2.
(3) The hexagonal barium titanate powder as set forth in (2), wherein
M is a trivalent metal ion selected from the group consisting of Mn, Cr, Ga and Co.

(4) A dielectric ceramic composition comprising a sintered compact of barium titanate powder as set forth in any one of the above (1) to (3) as a main component.

(5) An electronic component comprising a dielectric layer composed of the dielectric ceramic composition as set forth in the above (4) and an internal electrode layer.

(6) A method of producing the hexagonal type barium titanate powder comprising steps of:

preparing a mixed powder including a barium carbonate powder with a specific surface area of 20 m$^2$/g or more, a titanium dioxide powder with a specific surface area of 30 m$^2$/g or more and a powder comprising M element (M is the element which effective ionic radius of the trivalent ion is in the range from 0.58 to 0.64 Å) with a specific surface area of 5.0 m$^2$/g or more, and heat-treating the mixed powder at 900° C. or higher and less than 1300° C.

Effect of the Invention

According to the present invention, the hexagonal type barium titanate powder having a fine and uniform particle size and contributing to thin a dielectric layer can be obtained. By using such hexagonal type barium titanate powder, a dielectric ceramic composition having advantage insulation property and capable of thinning dielectric layer as well as showing a comparatively high specific permittivity can be obtained.

BRIEF DESCRIPTION OF THE DRAWINGS

FIG. 1 is a multilayer ceramic capacitor according to one embodiment of the present invention.

Below, the present invention will be explained more precisely based on the embodiments.

<Multilayer Ceramic Capacitor>

As shown in FIG. 1, a multilayer ceramic capacitor 1 as a representative example of electronic components has a capacitor device body 10 wherein a dielectric layer 2 and an internal electrode layer 3 are alternately stacked. At the both end portions of the capacitor device body 10, a pair of external electrodes 4 connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

The dielectric layer 2 includes a dielectric ceramic composition according to the present embodiment. The dielectric ceramic composition according to the present embodiment has a main phase composed of hexagonal type barium titanate, and includes specific subcomponents. Note that, although compositional formulas of various oxides are shown in the following, the amount of oxygen (O) can be slightly deviate from the above stoichiometric constitution.

Firstly, it will be explained with respect to the hexagonal type barium titanate which is a main component and constitutes a main phase of the dielectric ceramic composition according to the present embodiment. The main phase composed of the hexagonal type barium titanate is formed by using following mentioned hexagonal type barium titanate powder as a raw material and firing thereof with subcomponents.

<Hexagonal Type Barium Titanate Powder>

The hexagonal type barium titanate powder according to the present embodiment has barium titanate powder having hexagonal structure (hexagonal barium titanate) as a main component. Specifically, 50 mass % or more, preferably 90 mass % or more, further preferably 95 mass % or more of hexagonal barium titanate is included with respect to 100 mass % of the hexagonal type barium titanate powder according to the present embodiment.

Note that, a hexagonal ratio can be obtained by X-ray diffraction analysis, and in the hexagonal type barium titanate powder according to the present embodiment, barium titanate having tetragonal structure or cubic structure may be included other than the hexagonal barium titanate.

When measuring the hexagonal ratio, specifically, firstly, it is examined as to whether a peak other than a peak originated from barium titanate (hexagonal, cubic, tetragonal) exists or not by a X-ray diffraction chart obtained by the X-ray diffraction method. If such peak exists, it is not preferable because the different phase ($Ba_2TiO_4$, $BaCO_8$ and the like) is generated in the obtained powder.

When the obtained powder is composed of barium titanate ($BaTiO_3$) only, it is examined by calculating a generating ratio of the hexagonal barium titanate. Specifically, a total of maximum peak intensities of hexagonal barium titanate, tetragonal barium titanate and cubic barium titanate is defined as 100%, a ratio that occupies the maximum peak intensity of the hexagonal barium titanate is defined as a generating ratio (abundance ratio) of the hexagonal barium titanate. When this ratio is 50% or more, the hexagonal type barium titanate powder which includes the hexagonal barium titanate as a main component can be obtained.

The maximum particle diameter of the hexagonal type barium titanate powder according to the present embodiment is 1.0 μm or less, preferably 0.5 μm or less, further preferably 0.1 to 0.3 μm.

Moreover, as for the hexagonal type barium titanate powder, a ratio (D90/D50) of 90% accumulated particle diameter (D90) and 50% accumulated particle diameter (D50) is 3.0 or less, preferably 2.5 or less, further preferably 2.0 or less.

Further, an average particle diameter (D50) of the hexagonal type barium titanate powder is preferably 0.1 to 0.7 μm, further preferably 0.1 to 0.5 μm.

In the present specification, a maximum particle diameter of the hexagonal type barium titanate powder, D50 and D90 are calculated by observing and measuring 1,000 particles with using SEM.

The hexagonal type barium titanate powder according to the present embodiment has the above mentioned constitution and also has a fine and uniform particle size. For example, the specific surface area measured by BET method is 2.0 m$^2$/g or more, preferably 3.0 m$^2$/g or more, further preferably 4.0 m$^2$/g or more.

Although the composition of the hexagonal type barium titanate powder according to the present invention is not particularly limited as far as it satisfies the above particle properties and the hexagonal ratio, a preferable composition in obtaining a hexagonal phase with absolute accuracy is shown by a generic formula of $Ba_A(Ti_{1-\alpha}M_\alpha)_BO_3$.

In the above formula, M is a trivalent metal ion having an effective ionic radius in the range from 0.58 to 0.64 Å, and preferably being selected from the group consisting of $Mn^{3+}$, $Cr^{3+}$, $Ga^{3+}$ and $Co^{3+}$, particularly preferably $Ga^{3+}$. Note that, the effective ionic radius described in the present specification are the values based on a literature "R. D. Shannon Acta Crystallogr., A32, 751(1976).

Moreover, A/B is preferably 0.900 to 1.040, further preferably 0.960 to 1.030. When A/B is too small, reactivity at time of generating the barium titanate becomes high so that it will be easy to fasten particle growth. Therefore, it is hard to obtain a fine particle and thus desired specific surface area tends not to be obtained. On the contrary, when A/B is too large, it is not preferable because an occupying ratio of Ba becomes larger so that Ba-rich barium orthotitanate ($Ba_2TiO_4$) tends to generate as a phase different from that of barium titanate.

The $\alpha$ in the above formula shows a substitution ratio of a trivalent ion M with respect to Ti, it is preferably 0.03 to 0.2. When the $\alpha$ is less than 0.03 and the trivalent ion M is too small, a hexagonal phase tends not to be formed. Further, when the $\alpha$ excesses 0.2 and the trivalent ion M is overplus, the phase different from $BaTiO_3$ tends to be formed.

Although the reason that the formation of the hexagonal phase is promoted by substituting the Ti site with the trivalent ion M is not always clear, probably because the Ti—O axis of 2a site extends, the Ti—O axis of 4f site contracts and the hexagonal structure is stabilized in $BaTiO_3$ crystal.

The hexagonal type barium titanate powder according to the present embodiment has a fine and uniform particle size, and even in case that dielectric layer of a multilayer ceramic electronic component is made thinner (e.g., thickness of interlayer: 1 µm), a number of the barium titanate particle placed between the interlayer can be at least 2 or more so that sufficient reliability (high temperature load lifetime) can be maintained.

Note that, although it is possible to atomize by pulverizing the obtained powder with using a ball mill and the like, in this case, particle size distribution becomes broader. As a result, deviation of particle size is larger and deviation of reliability is larger. Also, an impact (energy) and the like added to the powder when pulverizing gives an adverse effect to the powder, which is not preferable. Therefore, the barium titanate powder of the present invention having a fine and uniform particle size has extremely high degree of usability when the hexagonal barium titanate is generated.

Producing Method of Hexagonal Type Barium Titanate Powder

Next, a method of producing hexagonal type barium titanate powder according to the present embodiment will be explained. However, note that the hexagonal type barium titanate powder of the present invention is not limited to those obtained by the following producing method.

In producing the hexagonal type barium titanate powder according to the present embodiment, firstly, raw materials of barium titanate and a powder comprising M element having a predetermined particle property are prepared.

As for the raw materials of barium titanate, in the present embodiment, barium carbonate powder ($BaCO_3$) and titanium dioxide powder ($TiO_2$) are preferably used.

A specific surface area of barium carbonate powder is preferably 20 $m^2/g$ or more, further preferably 30 to 100 $m^2/g$, and a specific surface area of titanium dioxide powder is 30 $m^2/g$ or more, further preferably 40 to 100 $m^2/g$.

A powder comprising M element is a compound powder generating a trivalent ion M having the effective ionic radius in the range from 0.58 to 0.64 Å which substitutes with Ti site of barium titanate, preferably a compound comprising an element selected from the group consisting of Mn, Cr, Ga and Co. In addition, a valence of metal element M in the powder comprising M element which is used as a raw material does not always have to be a trivalent, it just has to be an element generating the trivalent ion M having the effective ionic radius in the range from 0.58 to 0.64 Å which substitutes with Ti site, in the heat-treatment condition as hereinafter mentioned.

The powder comprising M element may be oxides, moreover, may be carbonate, oxalate, nitrate, hydroxide, organic metallic compounds and the like. However, the oxides are preferably used in terms of the ease of controlling particle properties and availability.

As for the compounds comprising Mn, specifically, $Mn_3O_4$, $MnCO_3$ are used, as for compounds comprising Cr, $Cr_2O_3$, $CrO_2$ are used, as for compounds comprising Ga, $Ga_2O_3$, $Ga(OH)_3$ are used, as for compounds comprising Co, $Co_2O_3$, $CoO$ are used. These may be used as complex oxide, or may be used by combining two kinds or more.

A specific surface area of powder comprising M element is 5.0 $m^2/g$ or more, further preferably 10 to 100 $m^2/g$.

When the specific surface area of the barium carbonate powder, titanium dioxide powder and powder comprising M element which are raw materials is within the above range, a hexagonal type barium titanate powder having a fine and uniform particle size can be obtained. When the specific surface area is comparatively small and a coarse particle of raw material powder is used, a hexagonal type barium titanate can be obtained, however, it is hard to obtain a fine particle.

Next, the prepared raw materials are mixed after weighing so as to be a predetermined compositional ratio, and mixture of raw materials is obtained, if needed, by pulverizing. As for methods of mixing and pulverizing, for example, it can be exemplified a wet method for mixing and pulverizing wherein the raw materials are put into a conventionally known grinding container such as a ball mill and the like with solvent such as water, etc. Also, it may be mixed and pulverized by a drying method wherein a drying mixer, etc. is used. In addition, a specific surface area of raw material powder may be adjusted to the above range by pulverizing when preparing mixed powder. Further, at time of mixing and pulverizing, in order to improve dispersibility of the inputted raw materials, it is preferable to add a dispersing agent. As for the dispersing agent, conventionally known agent may be used.

Next, heat-treatment is performed to the obtained mixture of raw materials after drying if needed. A temperature rising rate at the heat-treatment is preferably 50 to 900° C./h. Also, a holding temperature at the heat-treatment may be set as higher than a transforming temperature to a hexagonal structure. In the present embodiment, the transformation temperature changes depending on A/B, Ti site substitution amount ($\alpha$) and the type of element M and the like, thus the holding temperature and heat treatment atmosphere can be changed depending on these. In order to obtain the hexagonal type barium titanate powder having a fine particle diameter and uniform particle size, the heat-treatment temperature is preferably set as more than 900° C. and less than 1300° C., particularly preferably set as 950 to 1150° C. A holding time is preferably 0.5 to 5 hours, further preferably 2 to 4 hours.

Moreover, it is preferable to properly set the heat treatment atmosphere depending on the type of element M. For example, when using Mn as element M, the atmosphere including oxygen is preferable. As for Mn, a divalent ion is stable in a reduction atmosphere. Therefore, the hexagonal phase tends not to be formed by heat-treatment in the reduction atmosphere, even if substituting Ti site with Mn. On the other hand, $Mn^{3+}$ is stable in the atmosphere including oxygen, and that promotes the formation of hexagonal phase by substituting Ti site with Mn. As for Cr, the trivalent is stable in the reduction atmosphere, but the hexavalent is predominance in the air-atmosphere. Hence, the heat-treatment in the reduction atmosphere is preferable. As for Ga, although the reduction atmosphere and the air-atmosphere make no difference to it, the reduction atmosphere is preferable. As for Co, the air-atmosphere is preferable.

By performing the heat-treatment, element M is substituted by and solid-soluted in the Ti site of $BaTiO_3$ as a trivalent ion, and it promotes generating the hexagonal type barium titanate.

Note that, when the holding temperature is too low, non-reacted and/or insufficient-reacted raw material (for example. $BaCO_3$ and the like) tends to remain.

Then, after passing the holding time of the heat-treatment, it is cooled from the holding temperature of the heat-treatment to room temperature so as to maintain hexagonal structure. Specifically, the cooling rate is preferably set as 200° C./h or more.

By performing this, hexagonal type barium titanate powder, which includes hexagonal barium titanate as a main component wherein hexagonal structure is maintained at room temperature, can be obtained. Although it is not particularly limited to examine as to whether the obtained powder is hexagonal type barium titanate powder or not, in the present embodiment, it is examined by X-ray diffraction method.

The hexagonal type barium titanate powder can be obtained by cooling from a temperature lower than a temperature at which hexagonal barium titanate stably exists normally (1460° C. or higher), thus it can be obtained as fine particle. Further, because composition and A/B ratio, etc. of the hexagonal type barium titanate powder are controlled within the above range, further fine and uniform particle can be obtained.

<Dielectric Ceramic Composition>

A dielectric ceramic composition forming a dielectric layer of electronic components and the like can be obtained by sintering the hexagonal type barium titanate powder obtained by the above manner and following mentioned subcomponents.

<Subcomponents>

As for subcomponents, at least one of alkaline earth oxide selected from the group consisting of MgO, CaO and BaO, as metal oxides, $Mn_3O_4$, and/or $Cr_2O_3$, and CuO and $Al_2O_3$, and oxides of at least one of rare earth element selected from the group consisting of Y, La, Ce, Pr, Nd, Sm, Gd, Tb, Dy, Ho and Yb, and glass component including $SiO_2$ are used.

Also, other subcomponents may be added to the above mentioned dielectric ceramic composition within a range which is available to achieve the purpose of the present invention.

<Multilayer Ceramic Capacitor>

Although a thickness of a dielectric layer 2 in a multilayer ceramic capacitor 1 shown in FIG. 1 which is a representative example of electronic components is not particularly limited, it is preferable 5 μm or less per one layer, more preferably 3 μm or less. Although a lower limit of the thickness is not particularly limited, for example, it is approximately 1 μm. Due to the dielectric ceramic composition according to the present embodiment, 50 or more of specific permittivity is shown with 1 μm or more of thickness. Although a number of stacked layers is not particularly limited, it is preferable 200 or more.

An average crystal particle diameter of dielectric particle included in the dielectric layer 2 is not particularly limited, it may be determined from, for example, a range of 0.1 to 1 μm, preferably 0.1 to 0.5 μm depending on the thickness of the dielectric layer 2. Note that, the average crystal particle diameter included in the dielectric layer is measured as follows.

Firstly, the obtained capacitor sample is cut with a vertical plane to an internal electrode, the cut face is polished. Then, chemical etching is performed to the polished face, after this, it is observed by a scanning electron microscope (SEM), and calculated by a code method with assuming a shape of the dielectric particulate is sphere.

Although conducting material included in an internal electrode layer 3 is not particularly limited, base metals can be used because the material constituting the dielectric layer 2 has resistance to reduction. As for the base metals used for the conducting material, Ni or Ni alloy is preferable. As for the Ni alloy, an alloy of at least one kinds of element selected from Mn, Cr, Co and Al with Ni is preferable, and Ni content in the alloy is preferably 95 wt % or more.

Although conducting material included in an external electrode 4 is not particularly limited, in the present embodiment, inexpensive Ni, Cu and their alloys may be used. A thickness of the external electrode 4 may be determined depending on a purpose of use in normally, it is preferable about 10 to 50 μm.

A multilayer ceramic capacitor in which the dielectric ceramic composition of the present embodiment is used, is produced by, as similar with a conventional multilayer ceramic capacitor, except for using the above-mentioned hexagonal type barium titanate powder as the raw material of the barium titanate, producing a green chip by a normal printing method or sheet method using a paste, then firing thereof, and firing after printing or transferring an external electrode.

The multilayer ceramic capacitor of the present invention produced according to the above is used for various electronic components and the like by mounting on a printed-circuit board and the like by soldering and the like.

The foregoing has described embodiment of the present invention, however, the present invention is not limited to the above mentioned embodiment at all, and various modification can be made within a scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any comprising the dielectric layer having the above composition.

EXAMPLES

Below, the present invention will be explained based on further detailed examples, however, the present invention is not limited to these examples. Note that, in the following examples and comparative examples, "specific surface area of the raw material and the product", "particle property of the product" and "hexagonal ratio" were measured as follows.

<Specific Surface Area of the Raw Material and the Product>

A specific surface area of the raw material powder and the product after the heat-treating was measured by BET method.

<Particle Property of Product>

As for the particle property of product after heat-treatment, 1,000 particles are observed and measured by a SEM and a maximum particle diameter, D50 and D90 are calculated from equivalent spherical diameter of each particle.

<Hexagonal Ratio>

The hexagonal ratio of the product after heat-treatment was calculated by X-ray diffraction analysis. For the X-Ray diffraction, Cu—Kα Ray was used as a X-Ray source, measuring condition thereof was 2θ=20° to 90° with 45 kV voltage, and electric current 40 mA, scanning speed of 4.0 deg/min, elapsed time of 30 seconds.

From X-ray diffraction chart obtained by the measurement, identifying respective peaks near 2θ=45°, evaluation was made as to whether barium titanate (hexagonal, tetragonal, cubic) and phase different from barium titanate exist. Next, with respect to samples wherein only peak of barium titanate was observed, maximum peak intensities of hexagonal barium titanate (h-BaTiO$_3$), tetragonal barium titanate (t-BaTiO$_3$), cubic barium titanate (c-BaTiO$_3$) were calculated. Then, an occupied ratio of the maximum peak intensity of h-BaTiO$_3$ to a total of maximum peak intensities of h-BaTiO$_3$, t-BaTiO$_3$ and c-BaTiO$_3$ were calculated so that a ratio of hexagonal barium titanate (h-BaTiO$_3$) was evaluated.

Examples 1 to 5, Comparative Examples 1 to 10

BaCO$_3$ (specific surface area: 25 m$^2$/g) and TiO$_2$ (specific surface area: 50 m$^2$/g) were prepared. Also, Mn$_3$O$_4$ (specific surface area: 20 m$^2$/g), Cr$_2$O$_3$ (specific surface area: 10 m$^2$/g), Ga$_2$O$_3$ (specific surface area: 10 m$^2$/g), Co$_2$O$_3$ (specific surface area: 10 m$^2$/g), MgO (specific surface area: 20 m$^2$/g), Al$_2$O$_3$ (specific surface area: 20 m$^2$/g), Fe$_2$O$_3$ (specific surface area: 10 m$^2$/g), In$_2$O$_3$ (specific surface area: 10 m$^2$/g), Ge$_2$O$_3$ (specific surface area: 10 m$^2$/g), SnO$_2$ (specific surface area: 10 m$^2$/g) were prepared as compounds comprising M element.

Using the compounds described in Table 1, as compounds comprising M element, they were weighed so that "α" and "A/B" in a generic formula of Ba$_A$(Ti$_{1-\alpha}$M$_\alpha$)$_B$O$_3$ becomes 0.1 and 1 and mixed with water and dispersing agent by a ball-mill. The obtained mixed powder was heat-treated under following mentioned heat-treatment condition so that hexagonal type barium titanate powder was produced.

The heat-treatment condition was that temperature rising rate: 200° C./hr, holding temperature: temperature as shown in Table 1, temperature holding time: 2 hours, cooling rate: 200° C./hr, and heat treatment atmosphere as shown in Table 1. Also, the "air" in heat-treatment atmosphere indicates the heat-treatment in the air wherein oxygen partial pressure is 0.2 atm, and the "reduction" indicates the heat-treatment in the atmosphere of 3% hydrogen and 97% nitrogen with the total gas flow of 2 L.

Following mentioned X-ray diffraction was performed to the obtained hexagonal type barium titanate powder. A maximum particle diameter and D90/D50 were calculated by observing with using SEM, and a specific surface area was measured by BET method. Results are shown in Table 1.

Comparative Example 11

A procedure similar with the examples was performed, except performing the heat-treatment in reduction atmosphere, with using BaCO$_3$ (specific surface area: 5 m$^2$/g), TiO$_2$ (specific surface area: 10 m$^2$/g), Ga$_2$O$_3$ (specific surface area: 5 m$^2$/g) as the raw material powder.

TABLE 1

| | Compunds comprising M Element | Heat-Treatment Condition | | Valence of M Ion | Radius(Å) of M Ion | Product Material after Heat-Treatment | | | |
|---|---|---|---|---|---|---|---|---|---|
| | | Temperature (° C.) | Atmosphere | | | Hexagonal Ratio(%) | Maximum Particle Diameter (μm) | D90/D50 | Specific Surface Area(m$^2$/g) |
| Examples 1 | Mn | 1100 | Air | 3+ | 0.58 | 98 | 0.7 | 1.9 | 4.7 |
| Examples 2 | Cr | 1100 | Reduction | 3+ | 0.62 | 51 | 0.7 | 1.8 | 5.5 |
| Examples 3 | Ga | 1100 | Air | 3+ | 0.62 | 90 | 0.8 | 2.3 | 2.9 |
| Examples 4 | Ga | 1100 | Redaction | 3+ | 0.62 | 87 | 0.7 | 1.9 | 3.6 |
| Examples 5 | Co | 1100 | Air | 3+ | 0.61 | 53 | 0.8 | 2.2 | 2.8 |
| Comparative Example 1 | Mg | 1100 | Air | 2+ | 0.67 | 0 | — | — | — |
| Comparative Example 2 | Al | 1100 | Air | 3+ | 0.54 | 0 | — | — | — |
| Comparative Example 3 | Mn | 1100 | Reduction | 2+ | 0.67 | 0 | — | — | — |
| Comparative Example 4 | Fe | 1100 | Air | 3+ | 0.55 | 0 | — | — | — |
| Comparative Example 5 | In | 1100 | Air | 3+ | 0.8 | 0 | — | — | — |
| Comparative Example 6 | Ge | 1100 | Air | 4+ | 0.53 | 0 | — | — | — |
| Comparative Example 7 | Sn | 1100 | Air | 4+ | 0.69 | 0 | — | — | — |
| Comparative Example 8 | Cr | 1100 | Air | 6+ | 0.44 | 0 | — | — | — |
| Comparative Example 9 | Ga | 1300 | Reduction | 3+ | 0.62 | 97 | 15.2 | 4.3 | 0.1 |
| Comparative Example 10 | Ga | 850 | Reduction | 3+ | 0.62 | *1 | — | — | — |
| Comparative Example 11 | Ga (course particles) | 1100 | Reduction | 3+ | 0.62 | 68 | 2.1 | 3.4 | 1.2 |

*Hexagonal Ratio is 7% or less and unreacted BaCo3 was remained.

From the above, a fine and uniform hexagonal type barium titanate powder, which has a high hexagonal ratio, was obtained by performing the heat-treatment in the atmosphere generating the trivalent ion at predetermined temperature range, with using a fine raw material powder which includes compounds comprising M element wherein the effective ionic radius of the trivalent ion is in a predetermined range.

On the other hand, when the ion other than trivalent is formed (comparative examples 1, 3, 6 to 8), when the trivalent ion is formed but the effective ionic radius is not in a predetermined range (comparative examples 2, 4, 5) or the heat-treatment temperature is too low (comparative example 10), the hexagonal type barium titanate powder could not be obtained. When the heat-treatment temperature is too high (comparative example 9) and a coarse powder is used as raw material, the hexagonal type barium titanate powder is produced. However, hexagonal type barium titanate powder had a larger diameter, but fine and uniform particle size could not be obtained.

EXPLANATION OF ITEM NUMBERS

1 - - - multilayer ceramic capacitor
2 - - - dielectric layer

3 - - - internal electrode layer
4 - - - external electrodes
5 - - - capacitor device body

The invention claimed is:

1. A hexagonal type barium titanate powder, wherein a maximum particle diameter is 1.0 μm or less,
   a ratio (D90/D50) of 90% accumulated particle diameter (D90) and 50% accumulated particle diameter (D50) is 3.0 or less,
   a hexagonal ratio is 50% or more,
   an average particle diameter is 0.1 to 0.5 μm,
   the powder is shown by $Ba_A(Ti_{1-\alpha}M_\alpha)_B O_3$, wherein
   M is a trivalent metal ion having an effective ionic radius in the range from 0.58 to 0.64 Å, a ratio A/B is in the range from 0.900 to 1,040, and α is in the range from 0.03 to 0.2, and
   M is a trivalent metal ion selected from the group consisting of Cr, Ga and Co.

2. The hexagonal type barium titanate powder as set forth in claim 1, wherein the hexagonal type barium titanate powder has a specific surface area of 2.0 $m^2$/g or more when measured by a BET method.

3. The hexagonal type barium titanate powder as set forth in claim 1, wherein the hexagonal type barium titanate powder has a specific surface area of 3.0 $m^2$/g or more when measured by a BET method.

4. The hexagonal type barium titanate powder as set forth in claim 1, wherein the hexagonal type barium titanate powder has a specific surface area ranging from 2.8 $m^2$/g to 5.5 $m^2$/g when measured by a BET method.

5. A dielectric ceramic composition comprising a sintered compact of barium titanate powder as set forth in claim 1 as a main component.

6. An electronic component comprising a dielectric layer composed of the dielectric ceramic composition as set forth in claim 5 and an internal electrode layer.

7. A method of producing the hexagonal type barium titanate powder according to claim 1, comprising steps of:
   preparing a mixed powder including a barium carbonate powder with a specific surface area of 20 $m^2$/g or more, a titanium dioxide powder with a specific surface area of 30 $m^2$/g or more and a powder comprising M element (M is the element which effective ionic radius of the trivalent ion is in the range from 0.58 to 0.64 Å) with a specific surface area of 5.0 $m^2$/g or more, and
   heat-treating the mixed powder at 900° C. or higher and less than 1300° C.

\* \* \* \* \*